Figure 1:
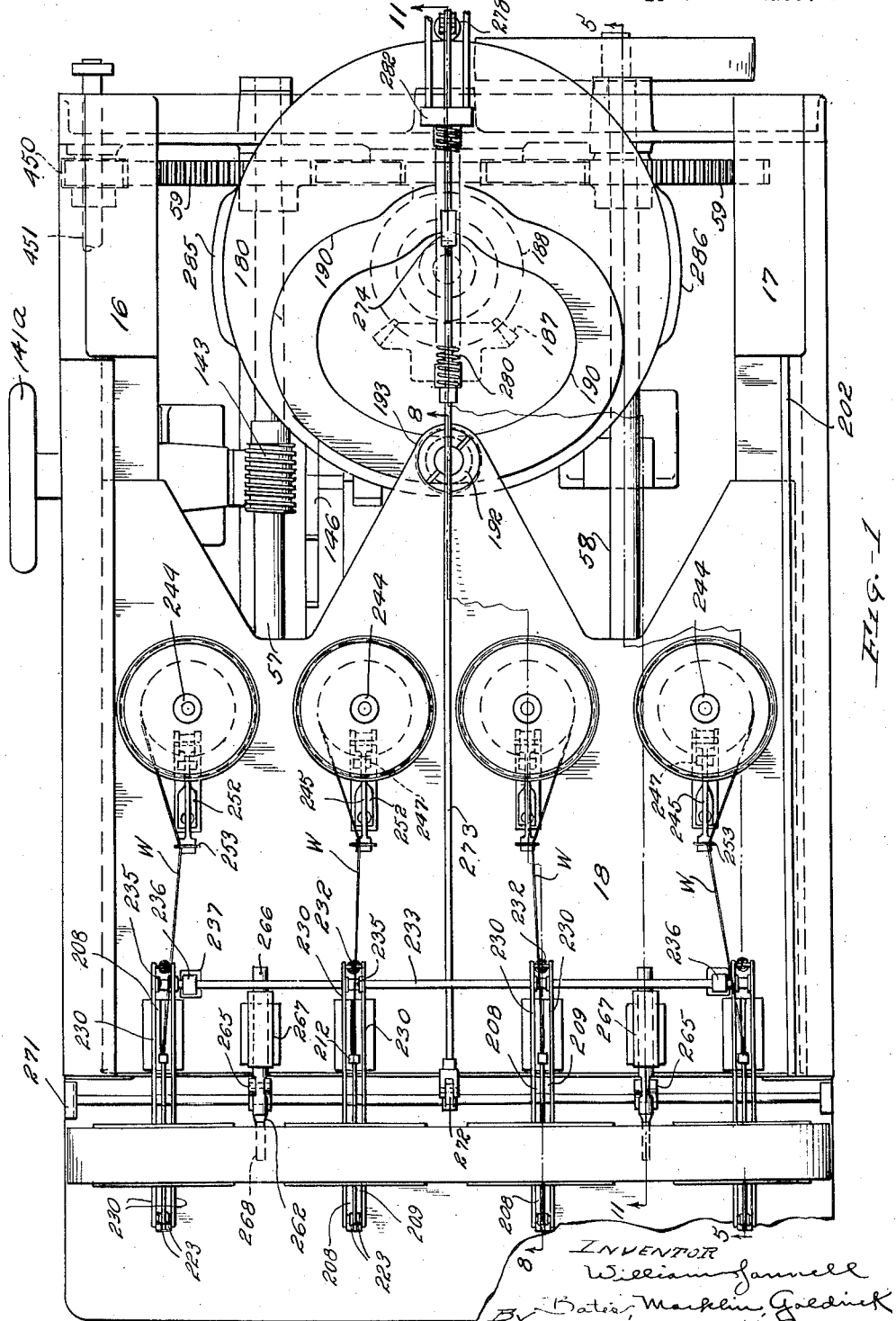

Dec. 28, 1926.

W. JANNELL 1,612,026

WINDING MACHINE

Filed June 7, 1924     10 Sheets-Sheet 1

INVENTOR
William Jannell
By Bates, Macklin, Goldrick & Teare
ATTORNEYS

Dec. 28, 1926.

W. JANNELL 1,612,026

WINDING MACHINE

Filed June 7, 1924    10 Sheets-Sheet 2

INVENTOR
William Jannell
BY Bates, Macklin, Goldrick &
Teare
ATTORNEYS

Dec. 28, 1926.

W. JANNELL

WINDING MACHINE

Filed June 7, 1924     10 Sheets-Sheet 3

1,612,026

INVENTOR
William Jannell
By Bates, Macklin, Goldrick &
Teare
ATTORNEYS

Dec. 28, 1926.

W. JANNELL

WINDING MACHINE

Filed June 7, 1924    10 Sheets-Sheet 6

1,612,026

Dec. 28, 1926.

W. JANNELL

WINDING MACHINE

Filed June 7, 1924   10 Sheets-Sheet 7

1,612,026

INVENTOR
William Jannell
Bates, Macklin, Goldrick &
Teare
ATTORNEYS

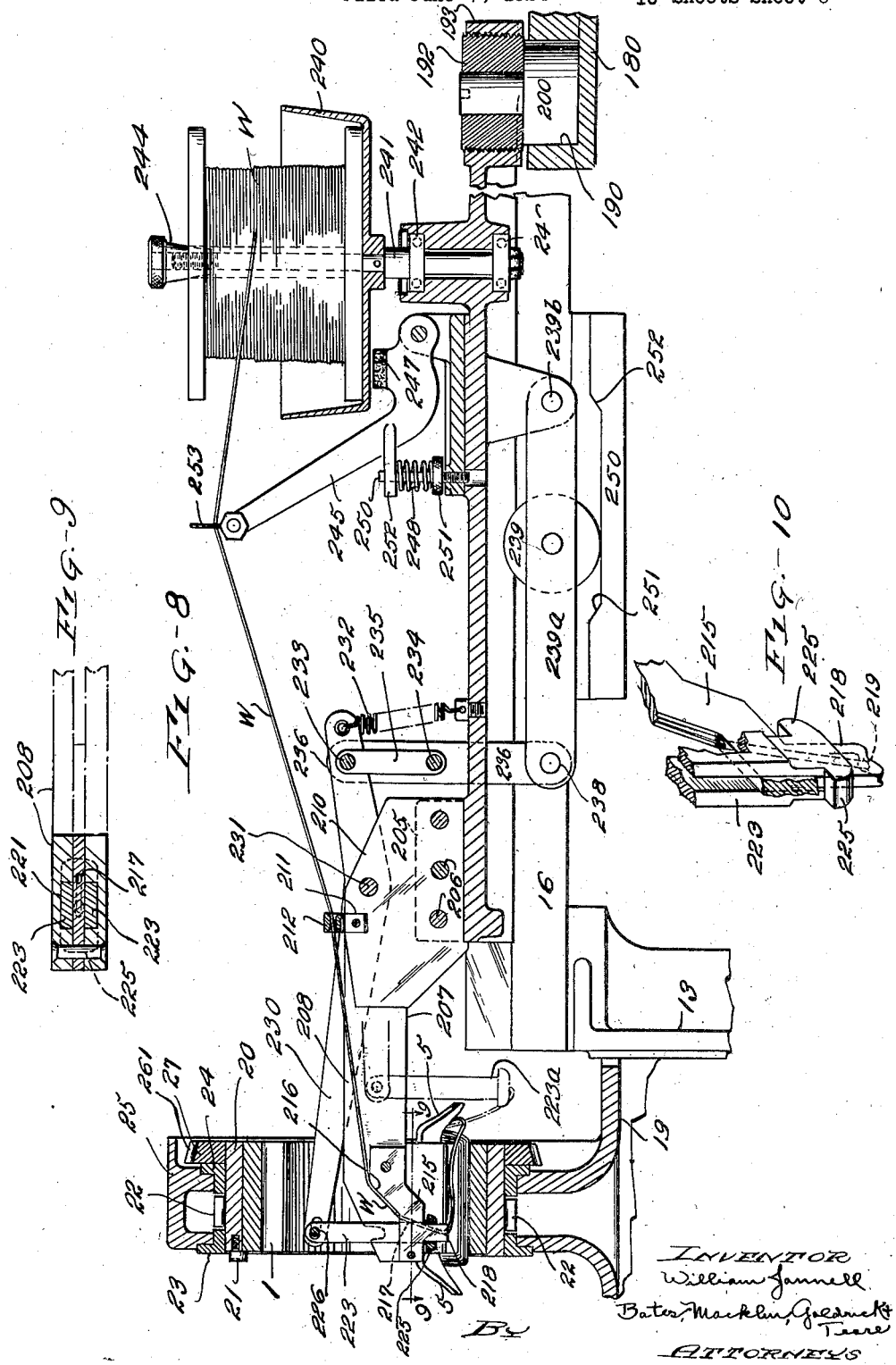

Dec. 28, 1926.
W. JANNELL
WINDING MACHINE
Filed June 7, 1924    10 Sheets-Sheet 9
1,612,026
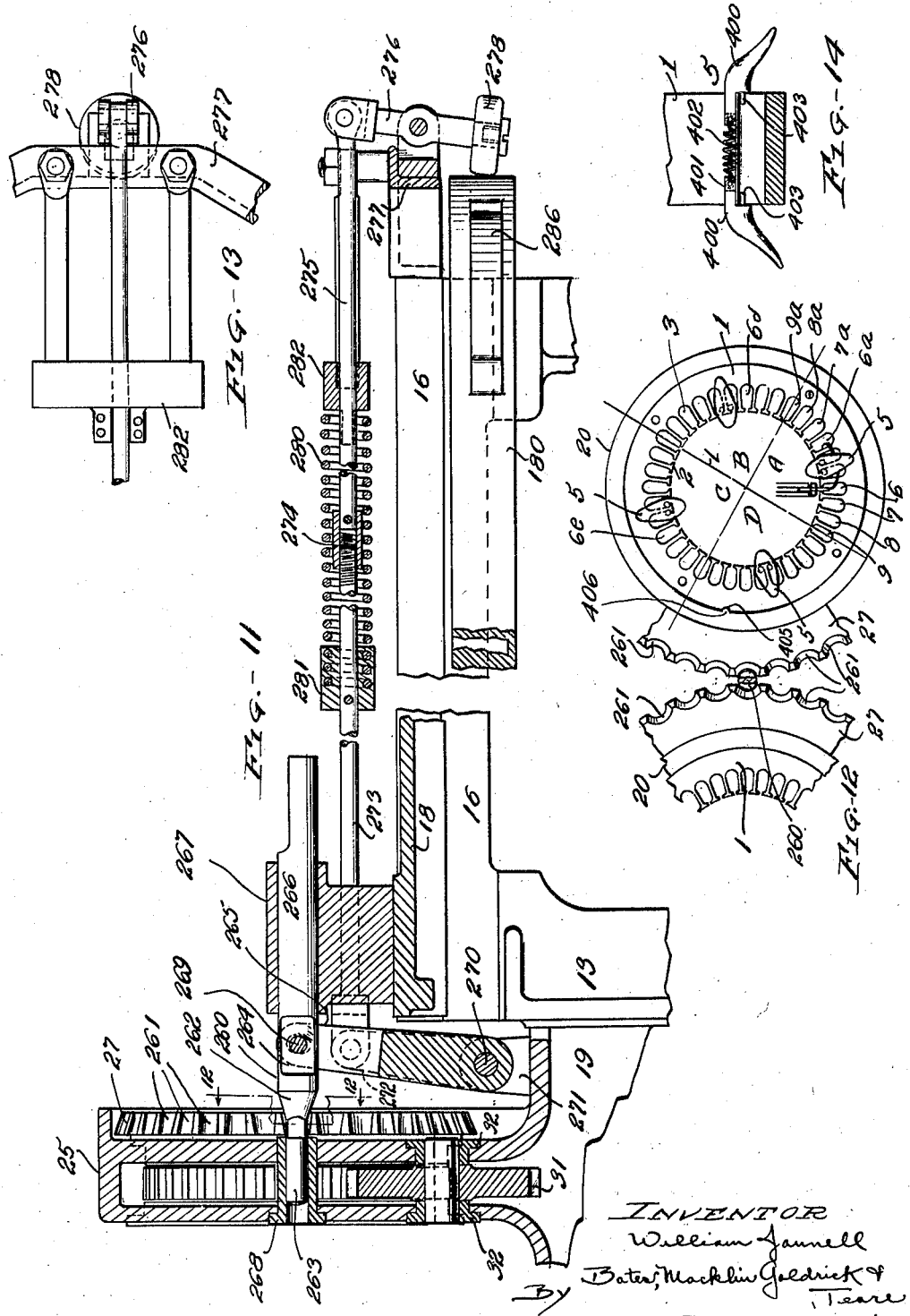

Dec. 28, 1926.

W. JANNELL

WINDING MACHINE

Filed June 7, 1924

1,612,026

10 Sheets-Sheet 10

INVENTOR
William Jannell
By Bates, Macklin, Goldrick &
Teare
ATTORNEYS

Patented Dec. 28, 1926.

1,612,026

UNITED STATES PATENT OFFICE.

WILLIAM JANNELL, OF CLEVELAND, OHIO, ASSIGNOR TO THE DOMESTIC ELECTRIC COMPANY, OF CLEVELAND, OHIO, A CORPORATION OF OHIO.

WINDING MACHINE.

Application filed June 7, 1924. Serial No. 718,435.

This invention relates to winding machines, particularly to machines adapted to wind conductor wires on armatures or field poles of electric motors and generators.

The general object of my invention is to provide an automatic machine which will wind a predetermined number of coils of wire upon each of the poles of a motor or a generator field by a continuous operation. It is a further object of my invention to provide a machine for completely and correctly winding a plurality of poles comprising a predetermined number of turns of wire without necessitating further attention on the part of the operator until a complete field winding of a continuous strand of wire has been effected.

A further object is to effect the automatic reversal of the direction of winding of alternate coils comprising the field windings without interrupting the continuous operation of the machine.

Another object is to effect the laying of a plurality of coils of wire in the field frame slots of a dynamo electric machine, to effect the laying of the exposed portions of the loops at the ends of the slots substantially in an arc concentric to the axis of the field frame.

Another object is to provide a machine for automatically oscillating a stator through increasing arcs while winding a predetermined number of coils of wire thereon in one direction, and for converting the oscillating movement into a shifting (or indexing) movement preparatory to winding a different pole at the stator in the opposite direction.

A further object is the provision of a novel clutch and friction drive mechanism which will be readily responsive to overload conditions arising through a disorganization or disarrangement for the co-operating parts of the machine.

Further objects include the provision of a novel arrangement of the co-operating elements of the machine necessitating an accurate resetting thereof after a complete cycle of windings has been effected before the machine can be again operated. Other objects will become apparent in the following description of my invention, relating to the accompanying drawings. The essential characteristics are summarized in the claims.

Figure 2:
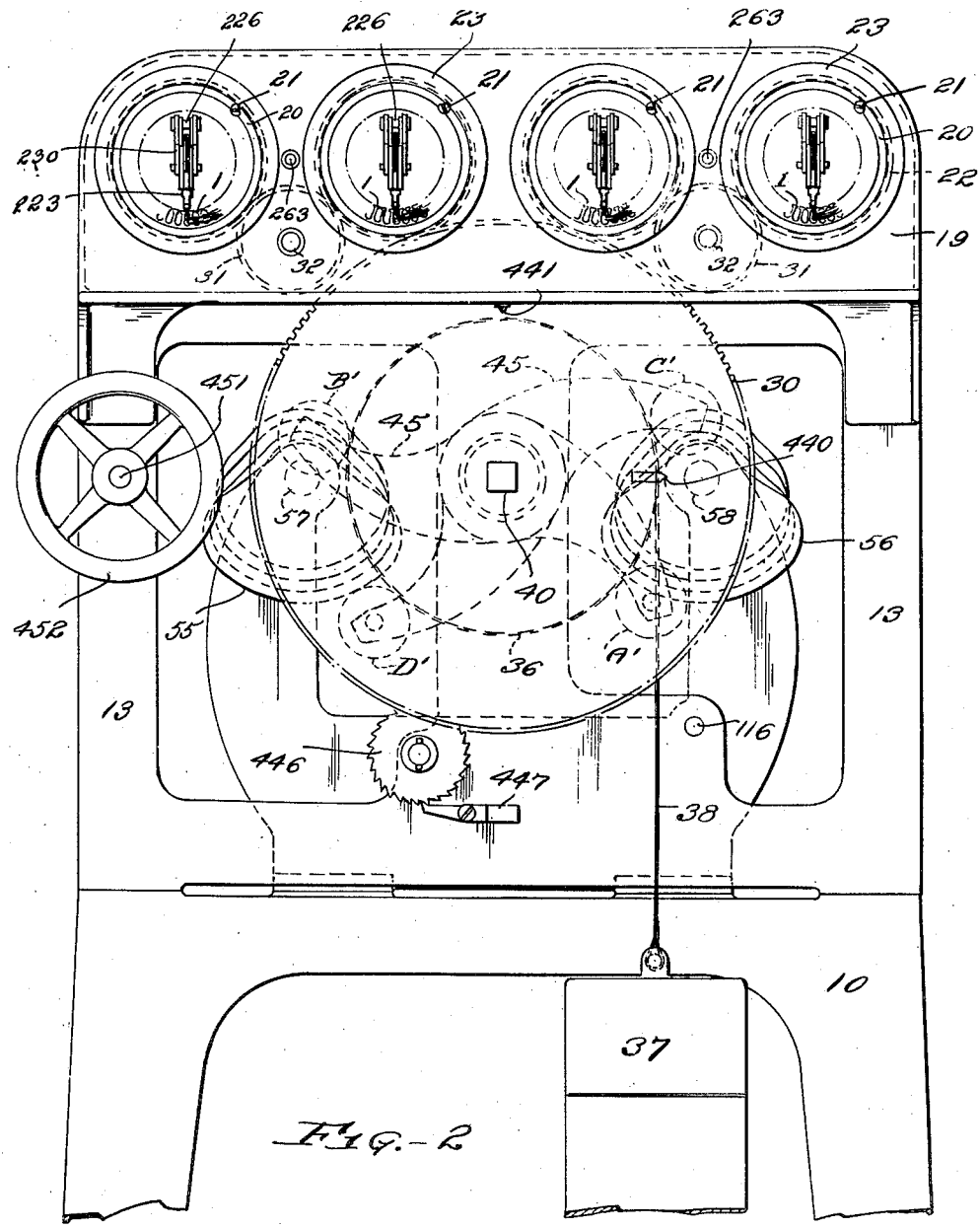
Figure 3:
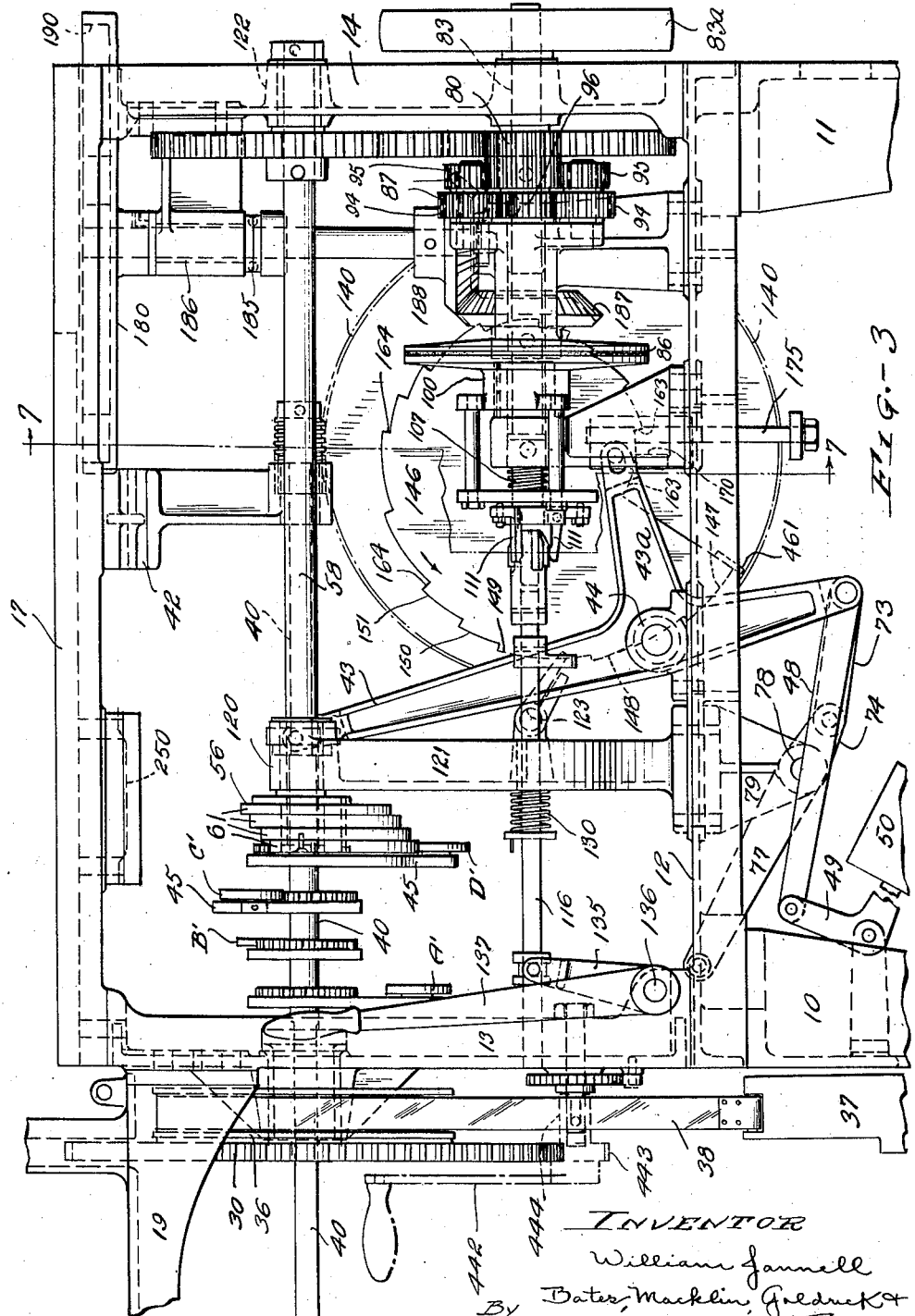
Figure 4:
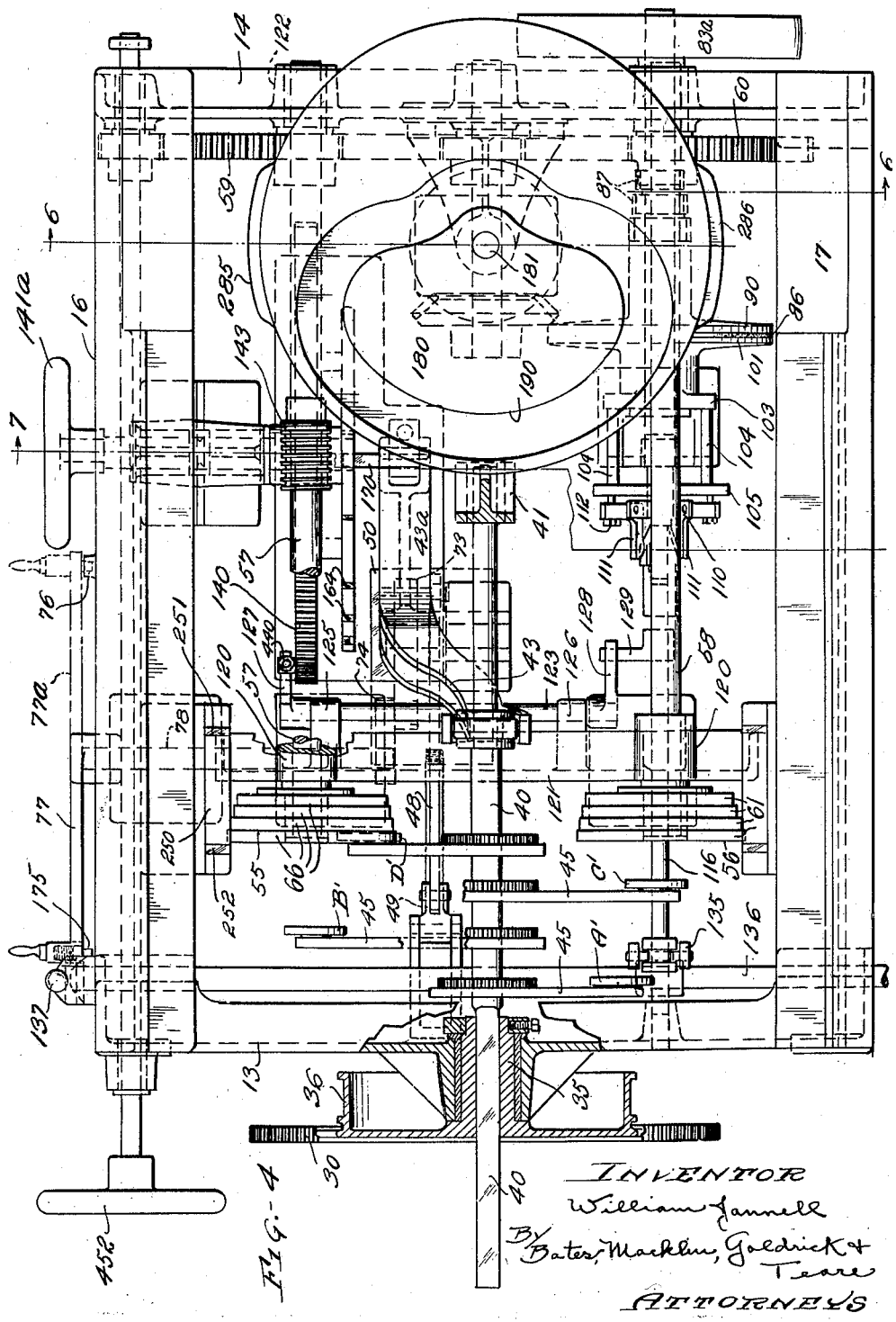
Figure 5:
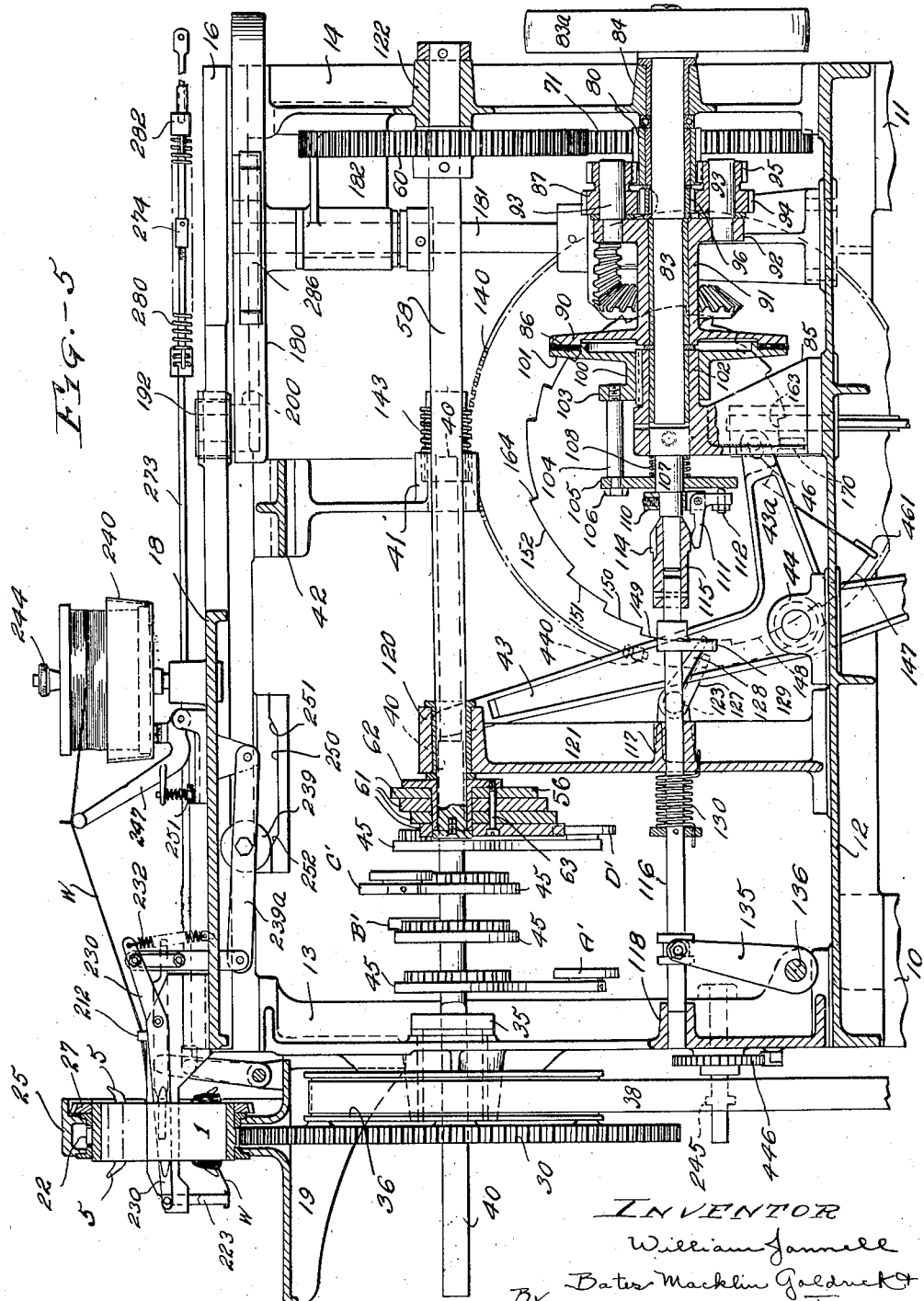
Figure 6:
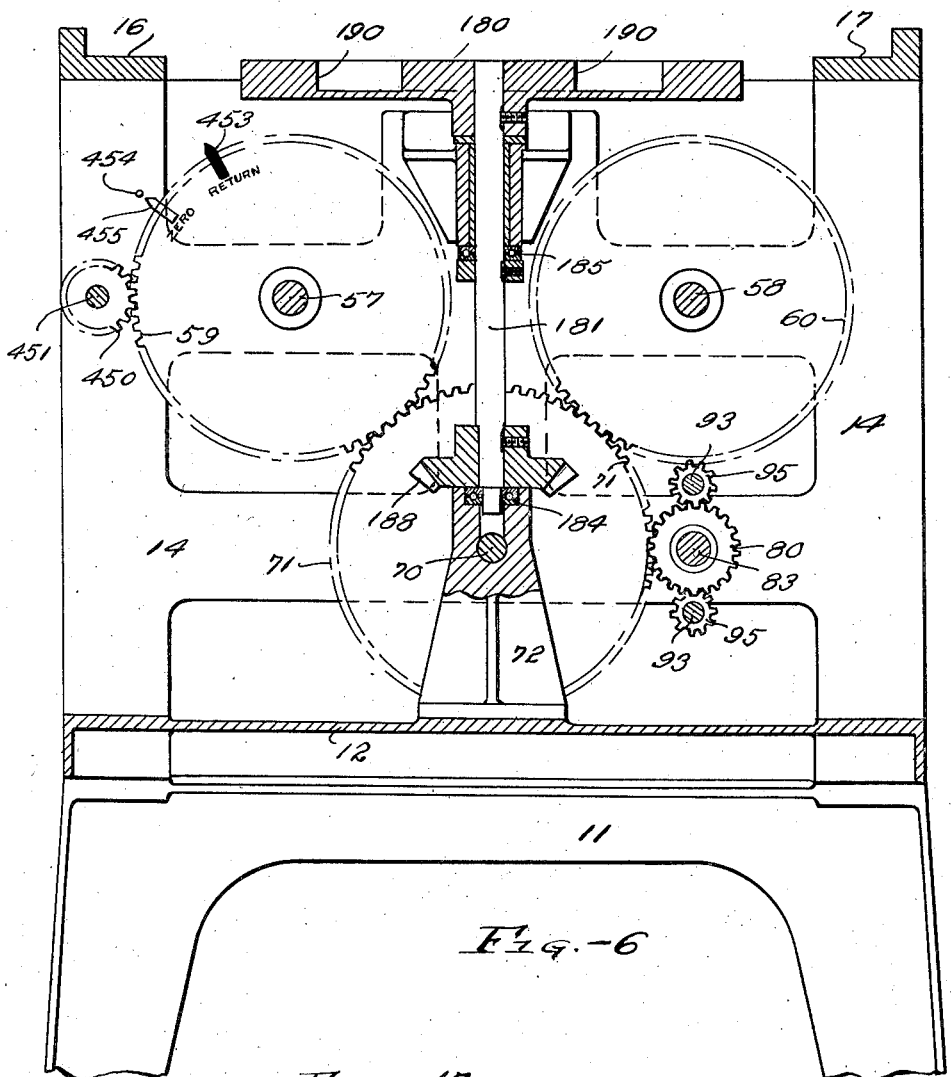
Figure 17:
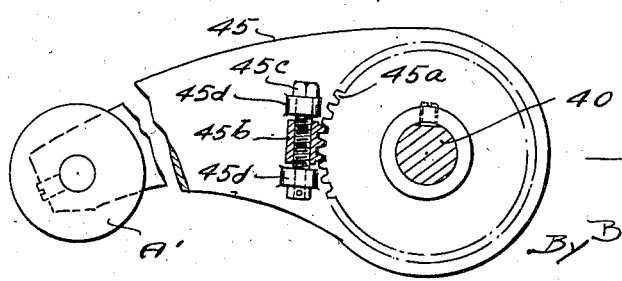
Figure 7:
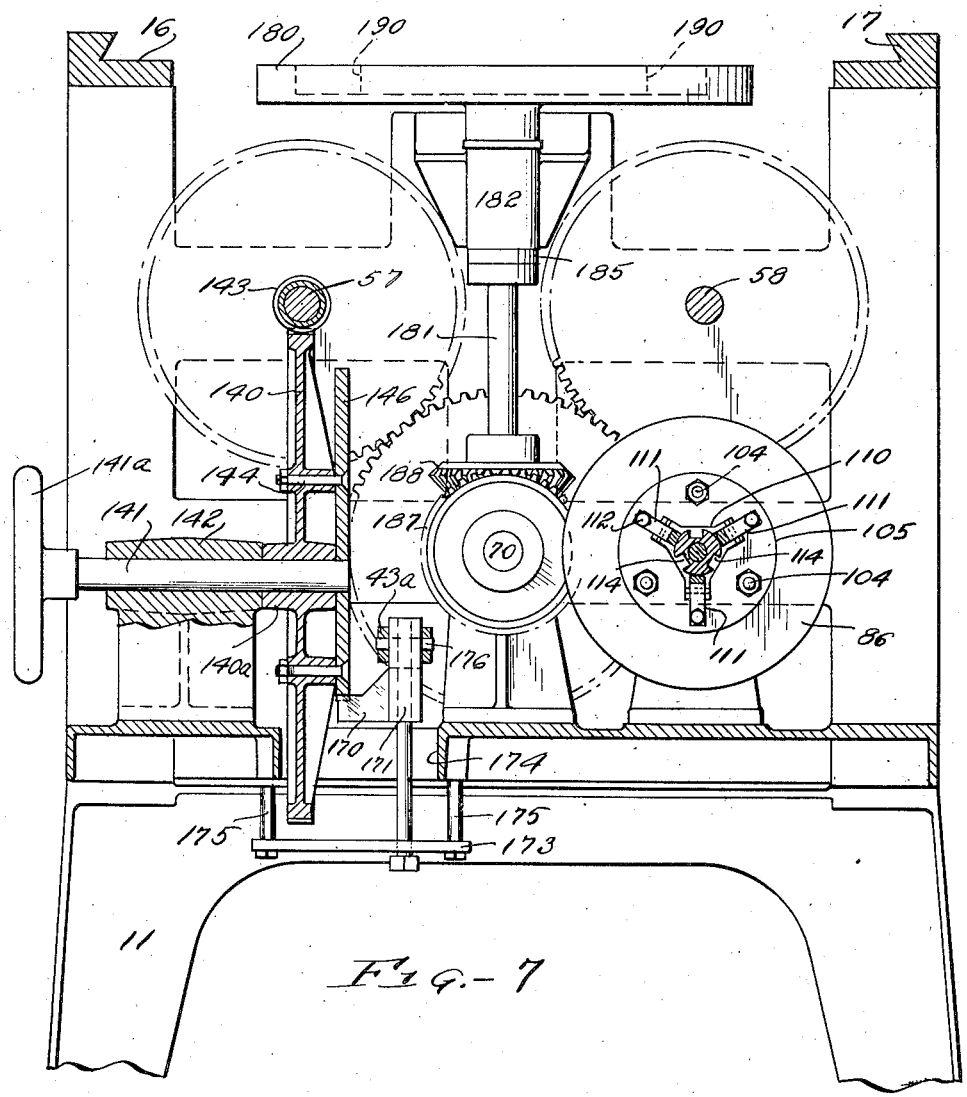
Figure 15:
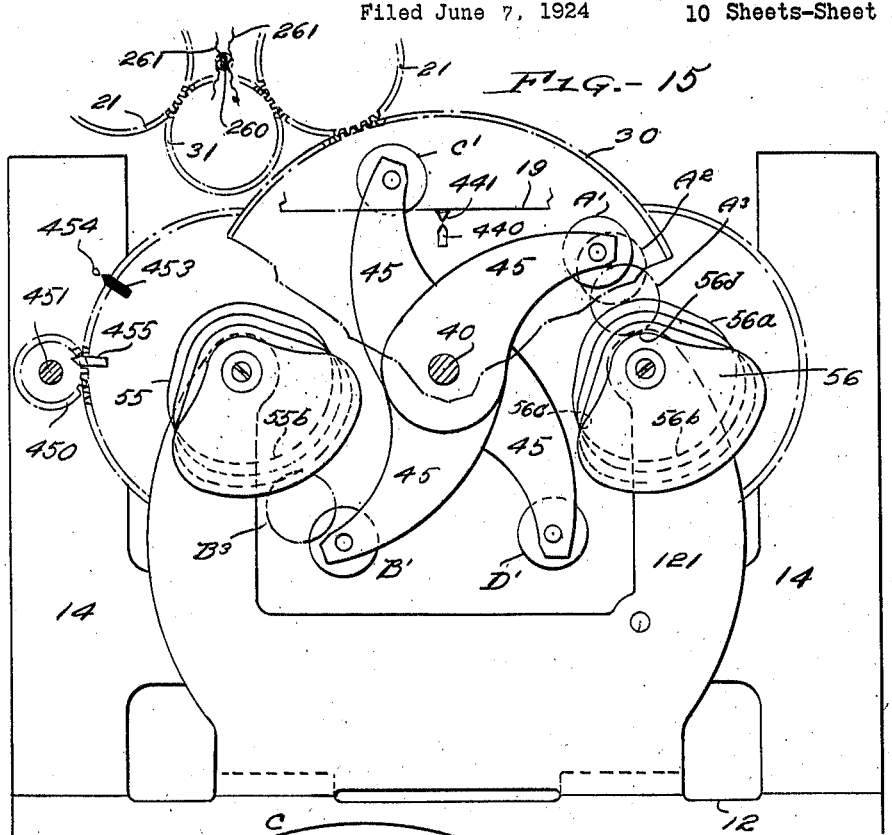
Figure 16:
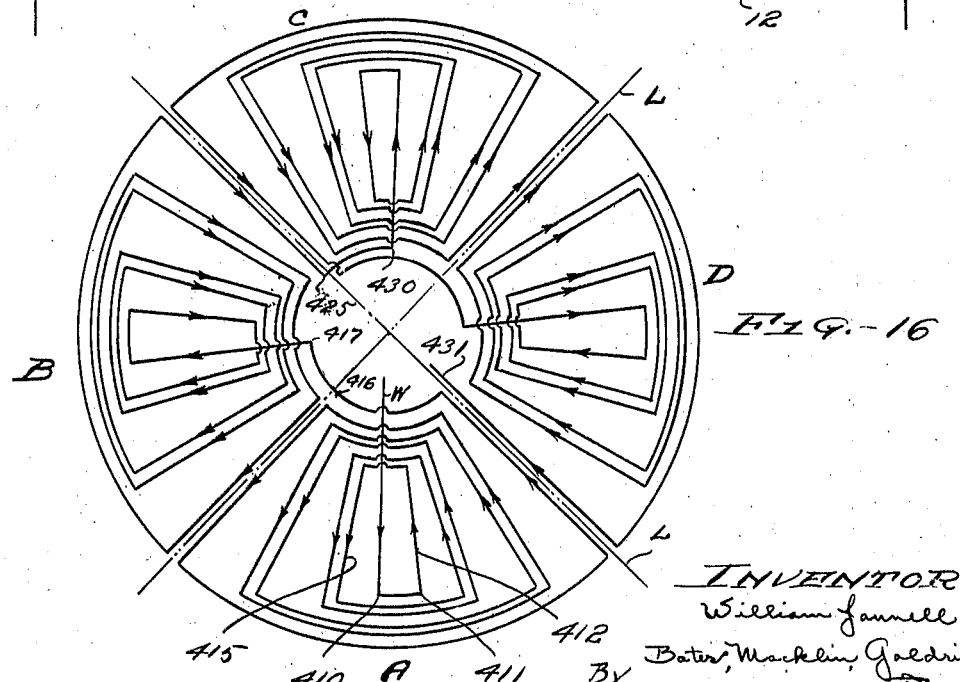

In the drawings, Fig. 1 is a general plan view of my winding mechanism; Fig. 2 is a front elevation thereof; Fig. 3 is a side elevation of the lower portion of the machine; Fig. 4 is a plan of machine, the reciprocating carriage which supports the winding arm and wire supply and the stator carrying brackets having been removed; Fig. 5 is a sectional side elevation taken along the line 5—5 of Fig. 1; Fig. 6 is a transverse section through the slide and cam operating gearing as indicated by the line 6—6 on Fig. 4; Fig. 7 is a transverse section through the coil counting mechanism and clutch controlling stopping mechanism as indicated by the line 7—7 on Fig. 4; Fig. 8 is a fragmentary cross-section of a reciprocatory winding arm carriage and mechanism co-operating therewith as indicated by the line 8—8 on Fig. 1; Fig. 9 is a cross-section through the wire laying guide and arm taken along the line 9—9 on Fig. 8; Fig. 10 is a fragmentary perspective of the wire laying apparatus; Fig. 11 is a cross-section of the stator aligning mechanism as indicated by the line 11—11 on Fig. 1; Fig. 12 is a fragmentary sectional rear elevation showing the stator supporting and aligning apparatus and one of the stators in place as indicated by 12—12 on Fig. 11; Fig. 13 is a fragmentary plan view of the rear portion of the aligning mechanism; Fig. 14 is a cross-section through one side of the stator frame showing a pair of the wire loop engaging hooks or brackets in place; Fig. 15 is a diagrammatic representation of the mechanism which oscillates the stators. Fig. 16 is a wire-laying diagram; Fig. 17 is a sectional rear elevation of one of the stator oscillating arms.

My invention contemplates the provision of a machine useful in winding coils having the general characteristics of motor stator field windings. However, the embodiment to be described is especially designed and adjusted for winding a predetermined number of turns of wire about the poles of the field, commonly known as the stator of an induction motor. The instant embodiment of my invention is adapted to form the field windings of the type of stator shown at 1, in Fig. 12, which has 36 T-shaped pole projections 2. The slots 3 formed therebetween are shown as divided into quadrants, A, B, C and D, by the perpendicular broken lines L; each quadrant forming a pole of the stator. The two slots adjacent the loop engaging brackets 5 are to be left vacant for the reception of a different gauge of wire which comprise the starting windings. The formation of these slots is entirely separate from the work to be done in this machine and need not be here described.

The windings to be formed by my machine are as follows: Referring particularly to Fig. 12 the slots 6 and 6$^a$ in the quadrant A are to receive each thirteen strands of coils, the adjacent slots 7 and 7$^a$, twenty-six strands each, the next adjacent slots 8 and 8$^a$ twenty-six and the last slots 9 and 9$^a$, each thirteen, all wound in the same direction about the pole, as for instance, clock-wise. The direction of winding the coils is to be reversed in each succeeding quadrant and the number of turns for corresponding pairs of slots is the same as in the quadrant A.

In the preferred embodiment of my invention shown in the drawings, 10 and 11, indicate front and rear leg frames, 12 the base or floor plate, 13 and 14, front and rear end frame members. The end frames are surmounted and spanned by side bars 16 and 17 which slidably engage and support the reciprocating winding head or carriage 18. Mounted forwardly of the end frame 13 is a bracket 19 which carries the stators to be wound.

Referring particularly to Figs. 2, 5, 8 and 10, it will be seen that I have provided for winding a plurality of stators, provision being made for mounting four in number in oscillating barrels 20 wherein they are secured by button screws 21. Each barrel carries on its periphery, gear teeth 22 through which the barrels are oscillated. Flanged rings 23 and 24 disposed at either side of the teeth serve to hold the barrel in rotatable position in the upright shell portion 25 of the bracket 19. Aligning rings 27 having conical notches on their peripheries co-acting with centering or aligning plungers, to be later described, are rigidly secured to each barrel at its rearmost position. The two central stator barrels are oscillated directly by an oscillating gear 30 carried forwardly of the main frame, through gear teeth 22 surrounding the barrels. The two outermost barrels are oscillated through idlers 31 journaled in bushings 32 in the casting 25, and connecting the outer and inner barrels. The gear 30 is rigidly mounted on a sleeve 35 journaled in the end frame members 13 and carried rearwardly thereof as shown in Fig. 4, is a drum 36, to which is attached a weight 37 by means of a strap 38. The weight normally tends to rotate the gear 30 clock-wise.

Slidably embraced by and splined to the sleeve 35 is the stator oscillating rock shaft 40, to which a number of rocker arms 45 are rigidly attached at regular intervals rearwardly of the front frame, carrying rollers A′ B′ C′ and D′. The preferred method of adjustably securing the oscillating arms to the shaft is shown in Fig. 17, wherein a gear 45$^a$ is shown as rigidly mounted upon the shaft adjacent one of the arms and a short rack 45$^b$ is held in engagement therewith in any desired position relative to the shaft. A threaded adjustment screw 45$^c$ supported by brackets 45$^b$ carries the rack and provides for fine adjustment. A depending bracket 41 supported by a bridge bar 42 extending between the rails 16 and 17 slidably supports the rear of the rocker arm shaft, and a compound shipper lever 43 mounted in brackets 44 on the floor plate controls the longitudinal position of the shaft and rocker arm. The operation of the shipper lever will be hereinafter described. One of the rollers carried by the arms is at all times, exclusive of shifting from one roller to another, in engagement with one of the oscillating cams 55 and 56.

I prefer to build each of the cams of individual plates 61, as shown in Fig. 6, assembling the whole on a flanged sleeve 62, rigidly secured to its respective cam shaft. The assembled cam plates are held together by screws 63. The cams are mounted on the cam shafts 57 and 58 supported at their forward ends at 120 by the upwardly extending arms of a standard 121, resting on the floor plate. Bearings 122 in the end standard 14 are provided to support the rear ends of the cam shaft. Gears 59 and 60 mounted on the cam shafts 57 and 58 respectively serve to drive the shafts as shown in Figs. 5 and 6.

For driving the cam shafts I have shown a gear 71 (Fig. 6) meshing with the two gears 59 and 60. This gear is rigidly mounted upon a shaft 70 centrally of the machine and supported at its forward end by a bracket 72 and rearwardly in the rear standards 14. The gear 71 is driven by a pinion 80 shown best in Fig. 5, as mounted on a sleeve 82 surrounding a drive shaft 83. This shaft is shown as mounted in the rear end frame 84 and a bracket 85 resting on the floor plate. To connect the drive shaft 83 with the pinion 80, I prefer to provide a friction clutch 86, planetary gearing 87, and clutch operating mechanism 88. One of the clutch members indicated at 90 is rigidly connected with the planetary gearing by a sleeve 91 which carries a pair of oppositely disposed ears 92 at its rearward end. Studs 93 are carried by the ears on which are freely mounted rigidly connected planetary gear members 94 and 95. The teeth of the latter mesh with the above mentioned pinion 80, while the former mesh with a sun gear 96 which is keyed to the drive shaft 83. Accordingly when the axes of the planetary gear are held against rotation, assuming the drive shaft to be rotating, the reaction of the sun gears is taken by the pinion 80 and is driven in the same direction as the drive shaft. When, however, there is no restraint on the orbital movement of the planetary gears, the difference in the gear ratio of the gears 96 and 94 and the gears 80 and 95 is neutralized by an orbital movement of the planetary axes and no power is imparted to the pinion 80.

To effect the above conditions I have splined a hub 100 of a clutch plate 101 upon an extension 102 of the bracket 85. Ears 103 on the hub carry a plurality of forwardly extending studs 104 which carry at their forward ends a circular plate 105 secured thereto by nuts 106. A short stub shaft 107 is mounted rigidly in the bracket 85 and extends through the plate rigidly carrying at its forward end a spider bracket 110, best shown in Fig. 7. In the radially extending bifurcated arm of this bracket I have mounted bent levers 111, the outwardly extending arms of which carry adjustable abutment screws 112, which bear against the plate 105. A compression spring 108 normally urges the plate 105 forwardly causing the clutch plate 101 to be held separated from the plate 90.

For effecting the closing of the clutch members, I have provided a hollow conical head 115 supported by the forward end of the stub shaft 107 and pinned to a sliding bar 116. This bar is mounted in the body portion of a cam shaft bracket at 117 and in the front end standard at 118. As shown in Fig. 7, the head has radially disposed slots at 114 into which the forwardly extending arms of the bent levers 111 are adapted to drop when the head is rotated a sufficient degree to bring the slots into registration therewith.

Mechanism for stopping the machine when the winding of one complete set of coils has been effected is best shown in Figs. 4 and 5, wherein it will be seen that I have provided a rock shaft 123 which is mounted in brackets 125 and 126 extending from the standard 121. Rigidly mounted on either end of the rock shaft, I have shown arms 127 and 128. The end of the arm 128 bears downwardly against a similar arm 129 rigidly mounted on the shaft 116, so that a downward pressure on the arm 127 would tend to rotate the shaft 116 against the turning movement imparted by a tortional spring 130. This rotation is sufficient to bring the slots into registration with the inwardly pressed lever arms 111 which accordingly drop into the slots, thus separating the clutch plates and stopping the machine. Such a downward pressure is exerted at the completion of a full cycle of operation of the machine, that is to say when a complete set of stators have been wound. This operation will be presently described.

The manual control of the clutch comprises a shipper arm 135 mounted on a rock shaft 136 near the forward end of the shaft 116, operably by means of a hand lever 137 disposed at either end thereof. By this means the machine may be thrown out of operation at any time it is desired by withdrawing the conical head 115 from engagement with the bent levers 111, thus manually releasing the pressure between the clutch plates.

Referring to Figs. 3, 4, 5, and 7, it will be seen that I have provided for driving the winding cycle counting plate by means of a worm gear 140 carried by a shaft 141 which is supported by an elongated bearing 142. The outer or left hand end of this shaft carries a hand wheel 141$^a$, the hub of which is separated substantially the width of the worm gear at its toothed portion from the hub of the bracket. This gear is slowly rotated in a counter clockwise direction, as shown in Figs. 3 and 4, by a worm 143 mounted on the cam shaft 57. The direction of rotation of the worm is such as will tend to push the gear to the left as shown in Fig. 7, retaining the hub 140$^a$ thereof against the abutting face of the bracket 142. By reason of the space between the hand wheel hub and the supporting brackets the gear may be shifted out of engagement with the worm manually when it is desired to reset the machine. The manner of resetting is to be later described. A stepped counting plate 146 which is shown in profile in Fig. 3 is secured to the gear by bolts 144. It will be noted that the periphery of the plate is described by a series of concentric arcs, the number of which correspond to the number of coil combinations on the stators to be wound. The arcs are of unequal length and are designated consecutively 147 to 153. Each succeeding arc, it will be noted approaches the center of the supporting shaft a uniform distance at the radial steps 164. The arc 147 describes one-half the angle that the next succeeding two, namely, 148 and 149, describe. The next two, 150 and 151, the same as 147 and so on. The purpose of this arrangement will be later described in the description of the operation of the machine.

For connecting the counting plate with the stator oscillating arms I have shown an arm 170 carried by a block 171 which has a downwardly extending rod 172. The arm is shown in Figs. 3 and 5 as abutting the plate at its most central portion. This rod is slidably embraced by a bridge bar 173 secured across an opening 174 in the floor plate of the machine by studs 175. The compound shipper lever 43 heretofore referred to has a rearwardly extending arm 43$^A$ bifurcated at its end and slotted as at 46 to engage the ends of a pin 176. The lower end 47 of the lever 43 is engaged by a bar 48 leading to a bent lever 49 pivoted beneath the floor plate and which carries a weight 50 normally urging the arm 170, carried by the block 171, upwardly against the counting plate. When the plate is rotated by the worm gear, a new portion of the counting plate is successively presented to the arm as each step 164 passes beyond it, which results in the rocker arm shaft 40, and its rocker arm being advanced forwardly uniform distances for each step of the plate. Since the weight 37 forwardly of the machine is constantly tending to turn the rocker arm shaft clockwise as it advances, the rollers A′, B′, C′, and D′ engage successively the faces of their respective cams 55 and 56. This will be more fully set out in the description of the operation of the machine.

Below the floor plate, Figs. 3 and 4, I have provided means for resetting the rocker arm shaft in the form of a crank 77 secured to a rock shaft 78 which are shown as supported by depending brackets 79. A link 73 connects the lower end of the shipper lever 43 to a rock arm 74 on the rock shaft 78. The crank 77 carries at its outer end a spring plunger 75 which may enter the recess 76 when the crank is swung manually to its rearmost position, in resetting the machine. This position is indicated by broken lines in Fig. 4 at 77ª.

The reciprocating carriage 18 (see Figs. 1, 5, 6, and 8) is preferably driven in synchronism with the stator oscillating cams and counting mechanism by a horizontal grooved cam 180 rigidly mounted on a vertical shaft 181. This shaft is supported by a bearing bracket 182 extending inwardly from the rear end standard 14 and by the standard 72 which carries the shaft 70. Thrust bearings may be provided, as at 184 and 185 for the shaft 181. A pair of bevel gears 187 and 188 are drivingly secured to the shafts 70 and 81 respectively. I have shown the cam 180 as having an eccentric groove 190 in its upward face which reciprocates the carriage 18 through a roller 200 mounted on a central rearward extension 201 of the carriage. The roller is preferably mounted in an externally threaded and removable bushing 192, as shown in Fig. 8, mounted in the extension at 193. This is for the purpose of more easily removing the roller at any time it is desired without dismantling the carriage. The bottom side of the roller may rest on the floor of the cam groove as shown, where a generous supply of oil may be kept at all times.

The two side bars 16 and 17 are adapted to slidably support the carriage 18 at the beveled overhanging portions 202 and 203, the usual gib 204 allowing for the required adjustment. Referring especially to Figs. 1, 5, 8, 9 and 10, I prefer to construct the wire laying mechanism as follows. Upright bifurcated brackets 206 are arranged along the forward edge of the carriage in which are mounted, as by means of screw 205, forwardly extending arms 207. The arms are formed of parallel plates 208 and 209, spaced apart by an intermediate irregular plate 210 at the attaching end and by an irregular needle or wire laying member 215 at their forward ends. The plate 210 has a cut away portion indicated at 211 to hold in place a perforated eye or wire guide 212. The needle member has an inclined upper face indicated at 216 over which the wire W rides into a hole 217 which terminates at the bottom of the depending projection 218 in a bellmouth 219 suitably smoothed and rounded to prevent abrasion to the wire W, while it is being pulled through the stator slots.

One of the features of my invention is that the needle for laying the horizontal stretches of the wire in the stator slots is relieved from lateral strain when the stator performs its rocking movement to form the loops at the ends of separated horizontal stretches. To this end I provide a supplementary wire guiding member which serves, near the end of each reciprocation of the needle to carry the bend in the wire below the end of the needle. For convenience this supplemental wire guide will be referred to as the stripper. As shown, the stripper consists of a vertically moving member 223, bifurcated at its upper end and slidably mounted in channels 221 in the arms 208 and 209. This construction is best shown in Fig. 9. The member 223 straddles the member 215 and the needle 218, the bifurcations being joined together forwardly and rearwardly of the needle by bridging portions 225. The lower end of the stripper is bell-mouthed with a very gradual radius whereby when it acts to form the transverse loops in the wire at the end of the horizontal stretches no abrasion of the insulation on the wire results. At both ends of the reciprocation of the wire laying arm, the stripper is borne downwardly by mechanism to be later described, and when this occurs, the bell mouth of the stripper bears against the wire carrying it downward in an oblique angled loop, as shown in Fig. 5 and again in broken lines at 223ª in Fig. 8.

It will be apparent from Fig. 10 that the members 223 may be made sufficiently heavy to provide a generous radius at the mouth as well as sufficient lateral strength to withstand the lateral pull of the wire when the stator is rocked. The needle on the other hand is made comparatively thin in order to easily enter the slots and hence is ill adapted to withstand such side strain or to have a generous laterally extending radius at its mouth.

To raise and lower the stripper I have provided a pair of levers 230 on either side of the wire laying arm. These levers are pivoted at 231 and slidably engage the free ends of a pin 226 carried by the upwardly extending ends of the stripper 223. The rearwardly extending arms of these levers are normally held downward by tension springs 232 secured at their lower ends to the carriage. The rearward arms are operatively connected to a cam roller mechanism comprising in part a pair of arms 239ª pivoted to and beneath the carriage at 239ᵇ and which carry rollers 239. This connection comprises a pair of lateral bracing bars 233 and 234 disposed one over the other and extending across the carriage to each of the wire laying arms as shown in Fig. 1. The bars are connected to each other by spacers 235 and to the arms 239ª by a pair of connecting links 236. Suitable apertures 237 (Fig. 1) in the carriage admit the links through the carriage. Cams 250 disposed at either side of the carriage and supported by the side rails 16 and 17 have forward and rearward rises 251 and 252 which engage the rollers 239. Accordingly near the end of each reciprocation of the carriage, the strippers are lowered to the position shown in 223ª in Fig. 8 at the time when the stator barrels are oscillated, and the loop formed in the wire W by the lowering and raising of the stripper 223 is caught by laterally projecting hooks or brackets 400 on the stators to be later described. By reason of the magnified movement of the strippers consequent upon the rollers 240 engaging the rises at either end of their cams, these rises may be very gradual to effect the desired rapid rising and falling of the stripper.

I prefer to mount the supply spool of wire W in a cup-shaped support 240, which I have shown as mounted upon a vertical shaft 241 preferably journaled in anti-friction bearings 242 and 243. The brim of the cups prevents the wire being unwound from the spool from falling down over the edge of the spool flange. The upper end of the shaft extends through the spool and a conical nut 244 thereon holds the spool in place. I prefer to provide a brake arm 245 pivoted at 246 in a bracket disposed below the spool support and having a brake shoe 247 normally pressed against the bottom of the cup 240 by compression spring 248. A stud 215 rises from the bracket having an adjusting nut rigidly formed therewith 251 and an extension 250 rising upwardly therefrom between the bifurcated fingers of a projection 252 on the arm 245, which provides for adjusting the upward force of the spring. A loop of heavy wire 253 at the extremity of the arm serves as a guide for the wire W and provides means whereby the periodical tension of the wire consequent upon its being drawn through the slots by the winding needle either forwardly or rearwardly, may release the brake and allow the spools to turn freely at the desired time.

My preferred form of precisionizing the stator oscillating barrel during the reciprocations of the wire laying needles is best shown in Figs. 1, 11, 12 and 13. The annular aligning plates 27 heretofore referred to are secured to the stator oscillating barrels 20 at their rearward ends. These plates have, on their periphery, conical notches 261 (Fig. 12). The plates turn close to each other as shown in this figure and between the plates of each couple of stator oscillating barrels, I have provided a plunger 260 having a forwardly disposed guiding pin 263 adapted to move in bushings 268 in the shell of the stator support. The shank 266 of the plunger is supported in a bearing bracket 267 rising from the carriage. Each plunger has a conical portion 262 adapted to coact with the notches 261 and, rearwardly thereof, a flat portion 264 for attaching a shipper arm 265. The upper end of this arm is bifurcated and straddles the flat portion of the plunger, slidably engaging a pin 269 thereon. A rock shaft 270 to which the arm is rigidly secured extends between brackets 271 on either side of the machine. A rocker arm 272 through a rod 273, adjusting nut 274 and a rod 275 connects the shipper lever to an operating lever 276 at the rear of the machine. I have shown this lever as carried on a cross member 277 and disposed above and to the rear of the carriage reciprocating cam 180. A roller 278 mounted on the lower end of this lever bears against the periphery of the cam by reason of a tension spring 280 secured at one end to a block 281 pinned on the rod 278, and at the other to a cross head 282 carried by a bar 277 as shown in Figs. 11 and 13. On opposite sides of the cam 180 (Fig. 1) I have shown peripheral rises or cheek cams 285 and 286, one of which is timed to engage the roller 278 when the wire laying needle is about to enter a stator slot upon either its forward or backward stroke. Consequently the conical end of the plunger 260 is driven into the complementary notches 261 on the aligning ring at the desired time to insure the registration of the stator slot, thereby preventing possible injury to the needle, due to backleash in the oscillating gearing.

By reason of the concealed position of the adjusting nut 274 the operator is less likely to change the amount of throw at the aligning plunger unless it should become absolutely necessary due to the wearing of the various parts. When this occurs the rear end of the bar 275 may be removed from the lever 276 and given either a half or complete turn to effect the required adjustment.

Previous to inserting the stators in the oscillating barrels 20, pairs of brackets or horns 5 previously referred to for engaging the loops of the wire to be wound on the stator, are attached centrally of each quadrant as shown in Figs. 12 and 13. These brackets consist of outwardly and downwardly curving fingers 400 having inwardly projecting portions 401 which carry at their inner ends the looped ends of coil springs 402. A pair of inwardly projecting pins 403 which engage the tips of the idle poles serve to hold the fingers in position. To prevent rotation between the barrels 20 in which the stators are mounted and the stator frames, I prefer to utilize transverse grooves 405, upon the periphery of each stator frame. These grooves are adapted to slide over a ridge 406, on the inner periphery of the oscillating barrels.

For the purpose of clearly setting forth the operation of the machine, the following assumptions will be made as to the relative position of the various parts of the machine. First that all of the oscillating barrels contain stator frames positioned as indicated in Fig. 12 and that all of the wire laying guides or needles 215 are behind the stators; second that all of the stator oscillating arms are withdrawn to their rearmost positions by the shipper lever 43 and that the roller A' rests upon the rearmost portion of the oscillating cam 56. This position is indicated in broken line at A², Fig. 15. It will be noted that this is the low part of this portion of the cam and therefore through the gear 30 the stators may be rotated slightly to the left with reference to Fig. 2 (or to the right as shown in Fig. 12) of its central position with respect to the first quadrant or "field pole" to be wound; third, that the cam 180 is turned 180° from the position shown in Figs. 1, 4 and 5 wherefore the carriage is at its rearmost position; fourth, that the counting plate 146 is turned substantially a complete revolution to the right from the position shown in Figs. 3 and 7, thus holding the horizontal arm of the shipper lever 43 in its extreme downward position to shift the oscillating arms rearwardly, fifth, that the clutch engaging head 115 is thrown forwardly to press the clutch plates 90 and 101 together, thereby locking the planetary driving pinions 94 and 95 in position. The operation of but one guide wire will be described since the others move in unison therewith.

As the cam 180 rotates to move the carriage bearing the winding mechanism forwardly, one of the cheek cams 285 or 286 on its periphery engages the roller 278 on the plunger mechanism shown in Fig. 11, just previous to the entrance of the winding guide or needle into the first stator slot. The plunger 262 continues to engage the conical notches 261 of the aligning plate until the needle has traversed the slot. As the needle clears the slot and completes its farthest forward movement, the roller 240, of the stripper operating mechanism (Fig. 8) rides against the inclined portion 251 of the cam 250 thereby lowering the stripper fingers 223 to the position shown in Fig. 5. Referring to the diagram Fig. 16, it will be seen that the strand of wire W has been laid in the direction indicated by the arrow points to the point 140. Up to this time, the roller "A" has been riding on the "low" concentric portion of the rearmost cam plate 61 of the cam 56. The rise 56ª, (Fig. 15) is now brought into contact therewith by the continued rotation of the cam shaft which, through the rocker arm and gearing, turns the stators through an angle corresponding to four of the stator slots. The relative position of the guide to the stator is indicated at 411 in the diagram. By reason of the lowered position of the stripper fingers 223 the wire during the turning of the stator has been looped under the first of the wire engaging hooks 5. A continued rotation of the horizontal cam 180 now returns the carriage and wire laying guide rearwardly through the slot 6ª, Fig. 12, or in the path shown at 412 in the diagram. As the guide emerges from the rear end of the slot, the position of the cam 56 is such that the roller rides off the high concentric portion 56ᵇ of the cam 56 to the eccentric portion 56ᶜ, thereby rocking the stator to the right until the needle is again poised in front of the slot 6 as before, and the coils of the wire W just described are repeated once for every complete turn of the cam 56. Since both the cam shafts 57 and 58 are rotated simultaneously the worm 143, carried by the shaft 57, has up to this time been advancing the counting plate in a counter-clockwise direction as shown in Fig. 5. At the completion of the desired number of turns above described, the abutment arm 170 carried by the horizontal arm of the shipper lever 43 (which through the shipper lever shifts the rock shaft 40 forwardly) reaches the first step 164 and rises from the most extreme outward face of the counting plate 147 to the face 148. This operation is timed to occur when the stator oscillating cams are about in the position shown in Fig. 15 and by reason of the forward shifting of the shaft 40, the roller A' drops to the next forward cam plate 61 of the cam set 5ᵃ. It will be noted that the low concentric portion of the second cam is less remote from the center than the first and that the high concentric portion is still farther from the center. Therefore, it will be seen that the rocking or oscillating movement of the rock shaft 40, and consequently that of the stator will be greater. The series of coils starting at 415 in the diagram, Fig. 16, corresponding to the slots 7 and 7ᵃ (Fig. 12) is accordingly more widely disposed.

In order that twice the number of turns may be placed in the slots 7 and 7ª the angle subtended by the arc forming the next succeeding portion of the counting plate 148 is twice that corresponding to the portion 147. The arc forming the next step 149 corresponds to 148 and accordingly the slots 8 and 8ª each receive, therefore, twice the number of turns that the first pair receives. In this case twenty-six each. When the abutment arm on the shipper mechanism reaches the end of the step 150, thirteen turns will have been wound in the slots 9 and 9ª and the winding, so far as this quadrant of the stator is concerned is completed when the winding guide has been withdrawn from the slot 9ª rearwardly of the stator, and, by reason of the subsequent counter clockwise oscillation of the stator, assumes the position indicated in the diagram at 416. That is to say, directly in the back of the slot 9ª.

Again referring to the diagram Fig. 16, it will be noted that the direction of the winding has thus far been counterclockwise. To effect the desired reversal of winding direction in the succeeding quadrant of coils, the roller B' now engages the cam 55. At the completion of the final turn of wire in the slot 9, the roller A' on the oscillating arm rests on the "low" portion 56ᵈ of the cam 56 as shown in broken lines in Fig. 15 at A³. The position of the roller B' on the cam at this time is shown in broken lines at B³, of the same figure. In this position it is a short distance from the concentric "high" portion of the first or rearmost section of the cam 55. The winding oscillations are so timed with reference to the counting plate that the shifting mechanism for the rock shaft 40 now acts to slide the roller A⁸ entirely off the cam 56, whereupon the roller B' is swung upwardly through the agency of the weight 37 into engagement with the cam 55 at the high portion 55ᵇ. The initial oscillating movement imparted to the rock shaft 40 will therefore be clockwise, resulting in a counter-clockwise turning of the stator to so position the stator that the slot 6ᵈ (point 417 in the diagram) is in registration with the wire laying guide. The winding from this point proceeds as in the first quadrant, except that the coils are laid in the opposite direction, and at the end of the winding of the quadrant B indicated in the diagram at 425, the stator barrel is rocked to the position relative to the guide indicated at 430 in the diagram, which position corresponds to the slot 6ᵉ in Fig. 12. This occurs when the roller B' rides off the extreme "low" portion of the cam 55 and the roller C' engages the cam 56 at its first "high" portion, namely 56ᵇ. The direction of winding is reversed in the same manner for the remaining quadrant.

When the final coil has been placed in the slot 9 (which coil corresponds to that indicated at 431 in the diagram) the counting plate will have turned nearly a complete revolution and the abutment arm on the shipper mechanism will be in engagement with the innermost portion 163 of the plate. At this time, an abutment 440, (Figs. 4 and 5) on the worm gear 140 will have pressed down onto the arm 127 mounted at one end of the rock shaft 123. This causes a downward rocking of the arm 128 on the other end of the rock shaft 123. The latter arm acts on the arm 129 on the shaft 116 thereby turning the shaft 116 against the torsion spring 130 a sufficient degree to allow the forwardly projecting ends of the bent lever 111 to drop into the slots 114, on the head 150. Thereupon the spring 108 acts to push the clutch plate forwardly and from disengagement with the plate 90, thus throwing the machine out of operation. No more coils can now be wound until the machine is entirely reset.

My preferred method of resetting the machine will now be described.

On the forward face of the gear 30, I prefer to provide a pointer 440, which will assume the position shown in Fig. 15 with reference to an indicator 441 on the stator support bracket, when the gear 30 is turned to a position such that the oscillating arms will clear the cams 55 and 56. This occurs when the rock shaft carrying the arms is slid to its rearmost position.

I provide for turning the gear manually in the manner shown in Fig. 3, by means of a detachable crank 442 carrying a gear 443 which is adapted to mesh with the gear 30 when the slotted sleeve 444 engages projecting pins 445 on the supporting shaft of a ratchet wheel 446. (Figs. 2 and 3). A detent pawl 447 provides for locking the gear 30 into whatever position it may be manually turned for resetting the machine.

In order to clear all of the oscillating arms the cams must be turned slightly counterclockwise, as shown in Fig. 15. To accomplish this, I prefer to provide a pinion 450 on a shaft 451 extending forwardly of a machine to a hand wheel 452. The gear meshes with one of the cam driving gears, namely 58 upon which I mount a pointer 453 shown in Fig. 15 in proximity to an indicating pin 454 on the rear end frame. With the above described parts in this position, I am able to return the oscillating arms to initial position through the link 73, rock shaft 78, and crank 77. I provide for holding the arms in this position against the weight 15, tending to throw them forward, by the plunger 75, fitting into the recess 76 as described.

The counting plate may now be returned to its initial position. With reference to Fig. 7, it will be seen that the shaft 141 upon which the counting plate and gear are mounted, may be shifted until the hub of the hand wheel 141ᴬ, engages the bracket 142 to disengage the teeth of the worm gear 140 from the teeth of the worm. Consequently the plate and worm gear may be manually rotated as desired. The abutment arm of the shipper lever mechanism is now in its lowermost position and the plate is returned until the arm is engaged by projection 461 on the highest, that is outermost portion on the periphery of the plate. The worm gear is then thrown into engagement with the worm. The rocker arm shaft is turned slightly to the left by the hand crank and pinion until the foremost roller A' engages its cam. The hand crank is then removed and the cams turned clockwise by means of the pinion 450 to their substantially upright or zero position, an indicator 455 being provided on the gear 59 to ascertain the correct starting position, as shown in Fig. 6.

In positioning the rocker arms so that they will clear the cams in their rearward movement the stator barrels are brought to a disaligned position with reference to the aligning rings W 61 and plungers 262. This disalignment is shown in the diagram Fig. 15. Setting the machine to zero position prior to resetting the rocker arms and removing the crank is effectively prevented since this turning of the cam shafts acts through their driving gears and the cam 286 to ineffectually tend to push the aligning plunger into the disaligned notches on the plates. If the repositioning of the worm gear is attempted previous to moving the cam shafts to zero position the teeth on the gear do not align with the threads on the worm.

Having thus described my invention, I claim:

1. In a winding machine, the combination of a stator supporting means, a member having a relative reciprocating movement into and out of the stator supporting means and having a wire laying needle, a member arranged to have a movement transverse to the relatively reciprocatory movement of the needle and to embrace the sides of the needle substantially at its end during a definite portion of the movement of the needle.

2. In a winding machine, the combination of an oscillating stator supporting means, a reciprocatory member adapted to enter a tator supported thereon, arranged to guide wire while so entering and movable when said means is stationary, a supplemental wire-winding guide carried by said member, means for imparting the movement to the guide which is transverse to the reciprocatory movement of the reciprocating member and means for actuating said reciprocatory member, and stator supporting means.

3. In a winding machine, the combination of a stator supporting and rocking means, a relatively reciprocatory member, having a hollow wire guiding needle arranged to lay horizontal stretches of wire in the stator slots, a wire guiding member carried by said relatively reciprocatory member, means for imparting a movement to the guiding member which is transverse to the said movement of the needle for forming loops connecting said horizontal stretches, and means for actuating said relatively reciprocatory member and said guide during a dwell in the movement of the rocking means.

4. In a stator winding machine, a stator supporting means, a wire guiding needle for laying horizontal stretches of wire on the stator and arranged to traverse the stator, a reciprocatory member supporting said needle, a member carried by the reciprocatory member having a movement independent of the needle and radially of the stator for reinforcing the needle against side strain during the formation of loops at the ends of the horizontal stretches and means for causing relative oscillatory movement between the stator supporting means and the wire guide to form such loops.

5. In a stator winding machine, a stator supporting means, and means for oscillating the stator supporting means, a guide for laying a wire strand on the stator, a reciprocatory member slidably supporting said guide and means for imparting movement to the guide toward and away from the stator and which is relative to the reciprocatory member.

6. In a stator winding machine, a stator supporting means adapted to be oscillated, a guide for laying a wire strand on the stator, a reciprocatory member supporting said guide, means for imparting movements to the guide compound motion increasing toward and away from the stator when the reciprocatory member is being actuated and means for actuating the stator.

7. In a winding machine of the character described, the combination of an oscillatable stator supporting means, a reciprocating member adapted to pass through a stator and the supporting means, a wire guide carried by said member and means for imparting movement to the guide relative to the supporting member, said movement being radial relative to the stator.

8. In a winding machine of the character described, the combination of an oscillatable stator supporting means, means for actuating said supporting means, a reciprocating member adapted to pass through a stator, and the supporting means, a wire guide carried by said member means for imparting movement to the guide relative to the supporting member therefore, said movement being radial relative to the stator a slide member supporting the reciprocating member and means carried by the slide for supporting a spool of wire.

9. In a winding machine of the character described, the combination of an oscillatable means, adapted to support a stator a reciprocating member adapted to pass into and out of a stator supported thereon, a slide supporting said member and reciprocating therewith, a wire guide carried by said member and means carried by the slide for imparting movement to the guide relative to the supporting member.

10. In a stator winding machine the combination of a reciprocating arm, a wire guide movably mounted upon the arm and adapted to be moved in a direction transverse to the movement of the supporting arm, oscillatory means for a motor stator frame with the slots thereof in juxtaposition to the movement of said guide and means for imparting relative movement to the arm and the guide whereby the guide is stationary relative to the arm during the major movement of the arm and the arm is stationary relative to the stator frame supporting means when the stator supporting means is oscillated.

11. In a stator winding machine the combination of a reciprocating arm adapted to enter a stator, a wire guide movably mounted upon the arm and adapted to be moved in a direction transverse to the movement of the supporting arm, oscillatory means for supporting a motor stator frame with the slots thereof in juxtaposition to the movement of said guide means for alternately moving the arm and guide and the stator supporting means, whereby the guide is stationary relative to the arm when the stator is moved.

12. In a stator winding machine the combination of a reciprocating arm, a wire guide movably mounted upon the arm and adapted to be moved in a direction transverse to the movement of the supporting arm, oscillatory means for supporting a motor stator frame with the slots thereof in juxtaposition to the movement of said guide and means for moving the arm and guide, and the stator supporting means whereby the guide is stationary relative to the arm when the stator is moved and precisionizing means acting on the stator supporting means when the arm and guide are moved.

13. In a stator winding machine, means for oscillating a stator relative to a fixed point, wire laying means comprising a reciprocating wire guide adapted to lay parallel stretches of coils of wire in the stator slots and supplemental guiding means associated with the guide and acting directly upon the wire for causing that portion of the coil which lies exteriorly of the slots to be displaced outwardly relative to the axis of the stator.

14. In a stator winding machine, means for oscillating a stator, wire laying means comprising a reciprocating wire guide having a needle adapted to lay parallel stretches of wire in the stator slots and wire guiding means associated with the needle and movable relatively thereto for causing the looped ends of the coil to be displaced outwardly relative to the axis of stator.

15. In a stator winding machine, means for oscillating a stator through a predetermined number of cycles, wire laying means comprising a reciprocating wire guide movable along a straight line adapted to enter the stator and lay horizontal stretches of coils of wire in the stator slots and means associated with the guide having a movement transversely of said line for causing the looped ends of the coils to be displaced outwardly relative to the axis of stator and cycle counting means for causing the oscillating means to rock the stator to a new pole position relative to the wire guide.

16. In a stator winding machine, means for oscillating an internally slotted field frame about its axis a predetermined number of times, reciprocating means for passing a wire laying needle in one direction through one of the slots and in the opposite direction through another of the slots and independently reciprocating means embracing the needle for causing the ends of the coil so formed to be looped outwardly relative to the field frame axis.

17. In a stator winding machine, means for oscillating an internally slotted field frame about its axis a predetermined number of times at one pole of the frame, means for passing a wire laying needle in one direction through a slot disposed at one side of the pole and in the opposite direction through an oppositely disposed slot, means associated with the needle and independently movable relative thereto for causing the ends of the coil so formed to be looped outwardly relative to the axis of the frame and means including the oscillating means for reversing the direction of winding in corresponding slots of alternate succeeding poles of the field frame.

18. In a stator winding machine, means for oscillating an internally slotted field frame about its axis a predetermined number of times, means for passing a wire laying needle in one direction through one of the slots and in the opposite direction through another of the slots during the dwell in the oscillations of the frame and means comprising a reciprocating sleeve embracing the needle and withdrawn to inactive position during the time when the needle is traversing one of the slots, and extending beyond the end of the needle near the end of each movement thereof for causing the looped ends of the coil so formed to be looped outwardly relative to the slotted member.

19. In a winding machine, rocking means for carrying an annular internally slotted field frame, means for oscillating certain combinations of the frame slots to and from a fixed point, an arm concurrently traveling backward and forward along the slots, operating means therefor, a wire guide associated with the arm for distorting the loop formed thereby outwardly from the axis of the frame near the end of each reciprocation of the arm and mechanism actuated by the arm operating means for positively aligning the slots of the frame with the arm.

20. In a winding machine, rocking means for carrying an internally slotted field frame, means for successively oscillating certain combinations of slots to and from a fixed point, a wire laying needle concurrently traveling backward and forward in predetermined combinations of slots and a hollow guide sleeve associated with the guide for distorting the loop formed thereby radially outward from the axis of the field frame at the end of each reciprocation thereof.

21. In a winding machine, an oscillatingly mounted holder, means for securing a stator frame within the holder, means for oscillating the holder through a predetermined angle, means for passing a wire laying guide into and out of said stator frame in timed relation to dwells in the oscillation of the holder, means for effecting a transverse movement of the guide relative to the movement of the last named means, means including a gear on the holder for successively oscillating the holder through greater angles upon the completion of a predetermined number of reciprocations of the guide and means active upon the completion of the required number of greater oscillations for causing the oscillating means to move the holder to bring a new group of stator slots into alignment with the guide.

22. In a winding machine, an annular motor field frame having inwardly facing slots, means for oscillating the frame, a wire laying mechanism adapted to be reciprocated into and out of a pair of said slots in timed relation to dwells in the oscillation of said frame along a fixed path including an auxiliary wire guiding member carried by the mechanism and movable relative thereto and means for moving said member radially of the stator frame at the end of each reciprocation of the mechanism whereby an outwardly disposed loop is formed and means mounted upon the stator frame for engaging the loop thus formed.

23. In a stator winding machine, an oscillatingly mounted motor frame holder, means for imparting a predetermined number of oscillations to the holder past a fixed point, means for increasing the degree of oscillation of the holder when said predetermined number of the lesser oscillations have been completed and means for causing the oscillating means to bring a new region of the holder to said fixed point and precisionizing means mounted on the holder and a plunger coacting with said means for every oscillation of the holder for precisionizing the holder.

24. In a winding machine, an oscillatingly mounted holder means for securing a stator frame within the holder, means for oscillating the holder through a predetermined angle, means for passing a wire laying guide into and out of said stator frame in timed relation to the oscillation of the holder, means for successively oscillating the holder through greater angles upon the completion of predetermined number of reciprocations of the guide and means active upon the completion of the required number of greater oscillations for causing the movement of the oscillating means relative to the reciprocating guide to be sustained in one direction to thereby cause the guide to start a new group of coils.

25. In a winding machine, an oscillatingly mounted holder means for securing a stator frame within the holder, means for oscillating the holder through successively increasing angles, means for passing a wire laying guide into and out of said stator frame during dwells in the oscillation of the holder, and means active upon the completion of the desired number of increased oscillations for causing the oscillating means to turn the stator supporting means to present a new pole of the stator and to cause the coils to be wound in a direction which is reverse to the direction of winding the previously formed coil.

26. In a winding machine, a work holder adapted to receive a motor stator frame, means for imparting a number of oscillations of predetermined angles to the work holder, a winding arm adapted to lay a continuous strand of wire in the stator slots in timed relation to dwell in the oscillations of the work holder, cycle counting means drivingly connected with the oscillating means, shifting mechanism actuated by the counting means for amplifying the degree of oscillation of the work holder and an escapement acting in conjunction with the oscillating means to move the work holder to a new working position.

27. In a winding machine, a stator frame holder means for imparting a number of oscillations of a given angle to the work holder, a winding arm adapted to reciprocate relative to the work holder during dwells in the oscillations of the work holder, counting means drivingly connected with the oscillating means and reciprocating shifting mechanism actuated by the counting means for increasing the degree of oscillation of the work holder when a predetermined number of reciprocations of the winding arm has been effected and an escapement acting in conjunction with the oscillating means to index the work holder to a new working position, and to reverse the direction of winding.

28. In a winding machine an oscillating work holder, a pair of continuously rotating cams, a rock shaft disposed there-between, an arm carried by the rock shaft adapted to engage one of the cams for rocking the work holder, means for moving said arm out of engagement with its cam upon the completion of a predetermined number of oscillations of the work holders, and another arm carried by the rock shaft which engages the other cam.

29. In a winding machine an oscillatable work support, a pair of cams, a rock shaft, a plurality of arms carried by the rock shaft, means whereby one of the arms engages one of the cams and means for moving said arm out of engagement with its cam upon the completion of a predetermined number of oscillations of said work holder, and another arm is thrown into engagement with a second cam, for indexing the work holder.

30. In a winding machine, a pair of work holding oscillating barrels, means for rigidly holding motor stator frames therein, interponent means for drivingly connecting the barrels aligning plates, carried peripherally of the barrels, a reciprocating arm adapted to move in and out of the motor stator frame, in timed relation to dwells in the oscillation thereof, means for reciprocating the arm and aligning means actuated by the reciprocating means and interposed between the plates for engaging said plates during the reciprocations of the arm.

31. In a winding machine, a pair of oscillatable work holders peripherally notched plates carried exteriorly of the holder, a reciprocating arm adapted to move in and out of said holders during dwells in the oscillations thereof, a carriage therefor operating means for said reciprocating arm, a plunger adapted to coact with the plate to precisionize the holder during the reciprocations of the arm, resilient means for withdrawing said plunger and adjusting means, concealed by said resilient means for adjusting the throw of the plunger.

32. In a winding machine an oscillatable work holder adapted to receive a motor stator frame, means for oscillating said holder, a wire laying arm adapted to move in and out of said holder during dwells in the oscillations thereof, a carriage supporting the arm, means for rotatably mounting a spool of wire on the carriage, means for normally holding the spool against rotation, an offset wire guide between the spool mounting means and the wire laying arm for releasing the spool and a cup surrounding the spool for retaining the unwound coils of wire.

33. In a winding machine an oscillatable work holder, means for oscillating the work holder past a working point, a rock shaft slidably connected with said oscillating means, rocker arms disposed at intervals along said rock shaft, a plurality of step cams disposed beside the rock shaft, one of said cams being engaged by one of the arms, means for rotating the cams to oscillate the work holder, shifting means for the rock shaft, counting means driven by the cam operating means in timed relation thereto to operate the shifting means whereby the engaging arm is shifted to the various steps of one of the cams of predetermined periods to cause a variation in the oscillations of the holder and finally out of engagement therewith to bring a second arm into engagement with a second cam for indexing the holder to a new working position.

34. In a winding machine an oscillatable work holder, means comprising a rock shaft and cam for oscillating said holder driving means therefor, cycle counting means geared to the cam operating means for controlling the number of oscillations of the work holder, a friction clutch interposed in said cam driving means, operation fingers therefor, a shaft carrying a head in engagement with said fingers, means whereby the turning of the shaft relative to the fingers disengages the clutch and means carried by the counting means and operative upon the completion of the desired number of oscillations in the work holder to turn the shaft to release the clutch.

35. In a winding machine an oscillatable motor stator frame holder, means for oscillating said holder, driving means therefor, cycle counting means for controlling the number of oscillations of the work holder, a friction clutch drivingly interposed in said cam driving means, operating fingers therefor, a shaft carrying a slotted head in engagement with said fingers, means whereby the turning of the shaft relative to the fingers, causes the slots to register with the fingers and to disengage the clutch and means coacting with the counting means and operative upon the completion of the desired number of oscillations in the holder to turn the shaft, release the clutch and stop the machine.

36. In a winding machine an oscillatable work holder, means for imparting a predetermined number of oscillations to the work holder of an increasing angle, cycle counting means geared to the oscillating means for controlling the number of oscillations of the work holder, a friction clutch drivingly interposed in said cam driving means, operating fingers therefor, a releasing member engaging said fingers, means whereby the movement of said last named member relative to the fingers disengages the clutch and means actuated by the counting means and operative upon the completion of the desired number of oscillations in the work holder to move the releasing member.

37. In a winding machine, a work holder oscillatingly mounted, a rock shaft drivingly connected with said holder for oscillating the holder, winding mechanism adapted to reciprocate relative to the work holder during dwells in the oscillation thereof, reciprocating means therefor a pair of cams disposed beside the rock shaft oscillating arms disposed at intervals along the shaft, drivingly connected with the reciprocating means, cycle counting means drivingly connected with one of the cams, shifting means for the rock shaft controlled by the counting means whereby the arms are progressed to cause alternate arms to successively engage alternate cams upon the completion of a predetermined number of oscillations of the work holder.

38. In a winding machine, a work holder oscillatingly mounted, a rock shaft drivingly connected with said holder for oscillating the holder, winding mechanism adapted to reciprocate relative to the work holder during dwells in the oscillation thereof, a pair of cams drivingly connected with said reciprocating means carried by the shaft, cycle counting means geared to the reciprocating means, shifting means for the rock shaft controlled by the counting, means whereby the arms are moved to cause alternate arms to successively engage alternate cams and means carried by the counting means for locking the machine in stopped position when a predetermined number of oscillations have been effected.

39. In a winding machine, an oscillatable work holder, means for imparting a series of predetermined number of oscillations hereto through increasing angles, a reciprocating wire winding means passing into and out of the work holder during dwells in oscillation thereof and in timed relation thereto, means comprising a pair of cams acting in conjunction with the oscillating means for indexing the work holder, cycle counting means drivingly connected to the cam operating means and to the reciprocating means for determining the number of oscillations of the work holder and means carried by the cycle counting means for stopping the machine when the required number of oscillations have been effected.

40. In a winding machine, an oscillatable motor stator frame holder, means for imparting a series of predetermined number of oscillations thereto through increasing angles, a reciprocating wire winding means passing into and out of the stator frame during dwells in the oscillations thereof and adapted to wind a single strand of wire in one direction while in conjunction with the oscillating means for indexing the work holder and for effecting the reversal of the direction of the winding on alternate succeeding poles of the stator and cycle counting, means drivingly connected to the cam operating means for determining the numbers of oscillations of the work holder.

41. In a winding machine of the character described, the combination of a stator supporting means, means for guiding a wire into and out of the stator to lay horizontal stretches of wire thereon, said means entering the stator slots, means for causing relative movement between the stator support and wire guiding means, to form loops at the ends of the horizontal stretches of wire, and a member having a movement independent of the wire laying means and arranged to reinforce the wire laying means against side strain when said relative movement is effected.

42. In a winding machine of the character described, means for supporting a stator, means including a needle having a reciprocatory movement relative to the stator for guiding and laying wire in separated stator slots, means for causing relative oscillatory movement between the stator support and needle to cause the wire to bridge from one slot to another to form coils, vertically moving means engaging the needle and arranged to relieve the needle from side strain during the relative oscillatory movement.

43. In a winding machine of the character described, means for supporting a stator frame, a relatively reciprocating member moving into and out of the stator frame, means for causing relative turning movement between said reciprocating member and the frame whereby separated slots in the stator frame are presented in registration to the reciprocating member, said reciprocating member being adapted to enter the slots and lay wire therein and means movable radially of the stator into position to brace the hollow member against side strain when said member is free of the slots.

44. In a winding machine of the character described, a plurality of frames each arranged to support a stator, wire guiding means movable relatively to the supporting means into and out of the stators to simultaneously lay horizontal stretches of wire therein, and means including a gear train connecting the stators for causing relative oscillatory movement between the wire guides and the stators to form loops connecting the horizontal stretches.

45. In a stator winding machine, means for removably supporting a plurality of stators including oscillatory frames connected to be driven in unison, a plurality of wire winding guides and a single sliding member arranged to support said guides and movable toward and away from the stators, and wire supply supporting members carried by the slide for each of the winding guides.

46. In a winding machine of the character described, a plurality of stator supporting frames drivingly connected to be oscillated in unison, wire guiding means reciprocating relative to the frames, a movable support for the wire guiding means, means for actuating the support, a plunger operable in timed relation to the reciprocations of the support and arranged to be operated by said actuating means and members rigidly connected to the stator supporting frames and arranged to to coact with the plunger to effect accurate registration of the guiding means with the stator slots.

47. In a stator winding machine, a plurality of stator supporting frames drivingly connected to be oscillated in unison, a bearing support for the frames, wire guiding means reciprocating relative to the frames to lay horizontal stretches of wire in the stator slots, a plunger operable in timed relation to the reciprocatory movement, and means rigid with the frames and arranged to cooperate with the plunger to secure accurate alignment between the guiding means and the stator slots, said plungers having a bearing support at either side of said cooperating means.

In testimony whereof, I hereunto affix my signature.

WILLIAM JANNELL.